(12) United States Patent
Peeters

(10) Patent No.: US 11,772,344 B2
(45) Date of Patent: Oct. 3, 2023

(54) PRODUCT WITH AN ARRAY OF CORE ELEMENTS OR VOIDS AND INTERPOSED SHEETS AND METHODS FOR FORMING SUCH A PRODUCT

(71) Applicant: FiberCore IP B.V., Rotterdam (NL)

(72) Inventor: Johannes Hendricus Alphonsus Peeters, Rotterdam (NL)

(73) Assignee: FiberCore IP B.V., Rotterdam (NL)

( * ) Notice: Subject to any disclaimer, the term of this patent is extended or adjusted under 35 U.S.C. 154(b) by 0 days.

(21) Appl. No.: 17/785,089

(22) PCT Filed: Dec. 16, 2019

(86) PCT No.: PCT/NL2019/050839
§ 371 (c)(1),
(2) Date: Jun. 14, 2022

(87) PCT Pub. No.: WO2021/125937
PCT Pub. Date: Jun. 24, 2021

(65) Prior Publication Data
US 2023/0047507 A1    Feb. 16, 2023

(51) Int. Cl.
*B29D 24/00* (2006.01)
*B29C 53/38* (2006.01)
(Continued)

(52) U.S. Cl.
CPC ............ *B29D 24/005* (2013.01); *B29C 53/38* (2013.01); *B29C 63/04* (2013.01); *B29C 70/865* (2013.01); *B29D 99/0021* (2013.01); *B32B 3/12* (2013.01); *E04C 2/3405* (2013.01); *B32B 2607/00* (2013.01)

(58) Field of Classification Search
None
See application file for complete search history.

(56) References Cited

U.S. PATENT DOCUMENTS

| 3,795,559 A | 3/1974 | Horn et al. | |
|---|---|---|---|
| 2011/0165385 A1* | 7/2011 | Peeters | B29C 70/42 428/179 |
| 2015/0217521 A1* | 8/2015 | Peeters | B32B 38/08 156/60 |

FOREIGN PATENT DOCUMENTS

| WO | 2007/129886 A1 | 11/2007 |
|---|---|---|
| WO | 2016/085336 | 5/2018 |

* cited by examiner

*Primary Examiner* — Elizabeth Collister
(74) *Attorney, Agent, or Firm* — N.V. Nederlandsch Octrooibureau

(57) ABSTRACT

A panel (20) having opposite surfaces (22, 24), and including sheets (42, 43) and elongated cores or voids (40). The cores/voids extend parallel along a first direction (X), are arranged mutually adjacent in a second direction (Y), and include an outermost core/void (40a) along a panel edge (26). Each sheet includes a medial portion (44, 45) between two adjacent cores/voids, a first lateral portion (46, 47) folded away from the medial portion over one adjacent core/void, and towards the second direction along the first surface, and a second lateral portion (48, 49) folded away from the medial portion over another adjacent core/void, and towards a negative second direction (-Y) along the second surface. The sheets include an enveloping sheet (43), the first lateral portion (47) thereof extending into a folded lateral region (50, 52) that at the panel edge is folded around the outermost core/void, and extends in the negative second direction back towards the second surface.

22 Claims, 3 Drawing Sheets

(51) Int. Cl.
    *B29C 63/04*     (2006.01)
    *B29C 70/86*     (2006.01)
    *B29D 99/00*     (2010.01)
    *B32B 3/12*     (2006.01)
    *E04C 2/34*     (2006.01)

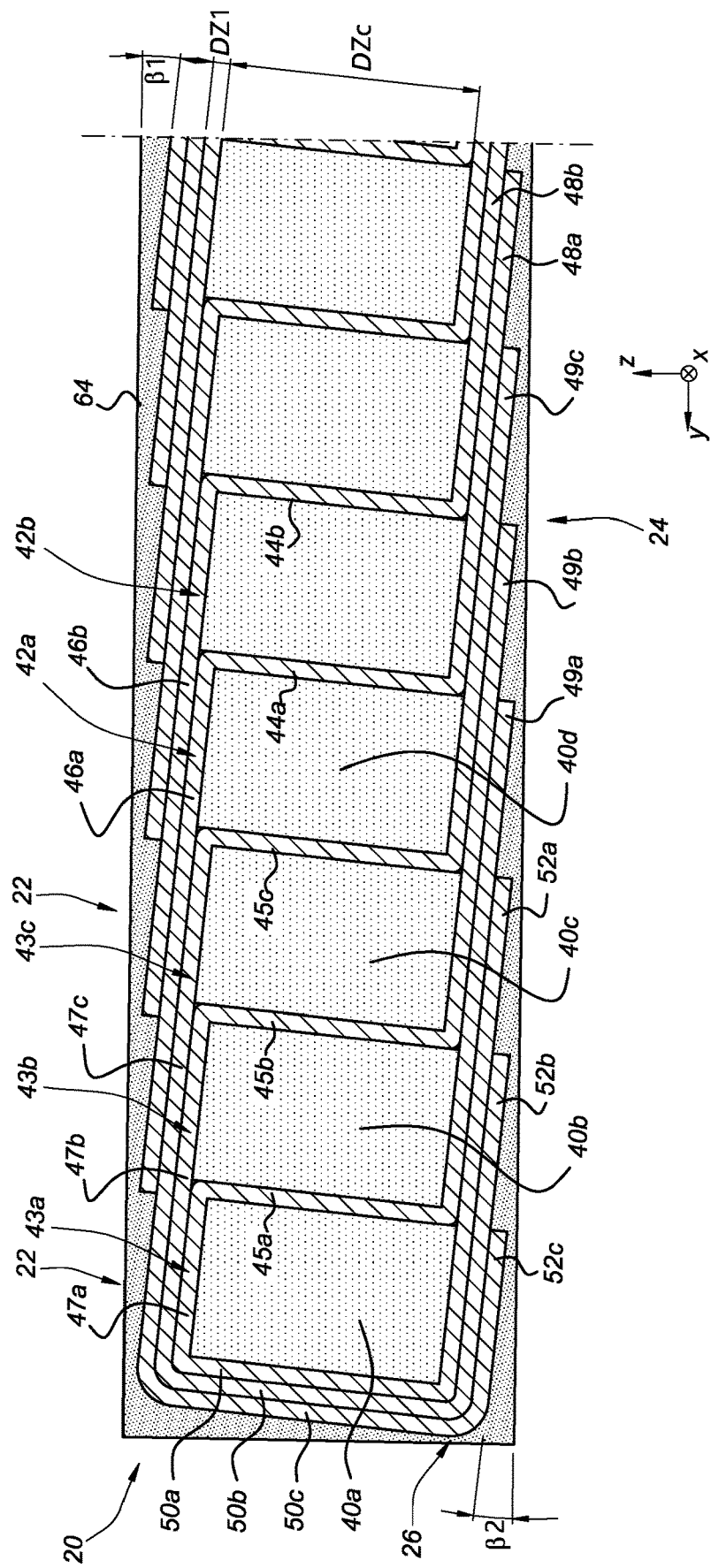

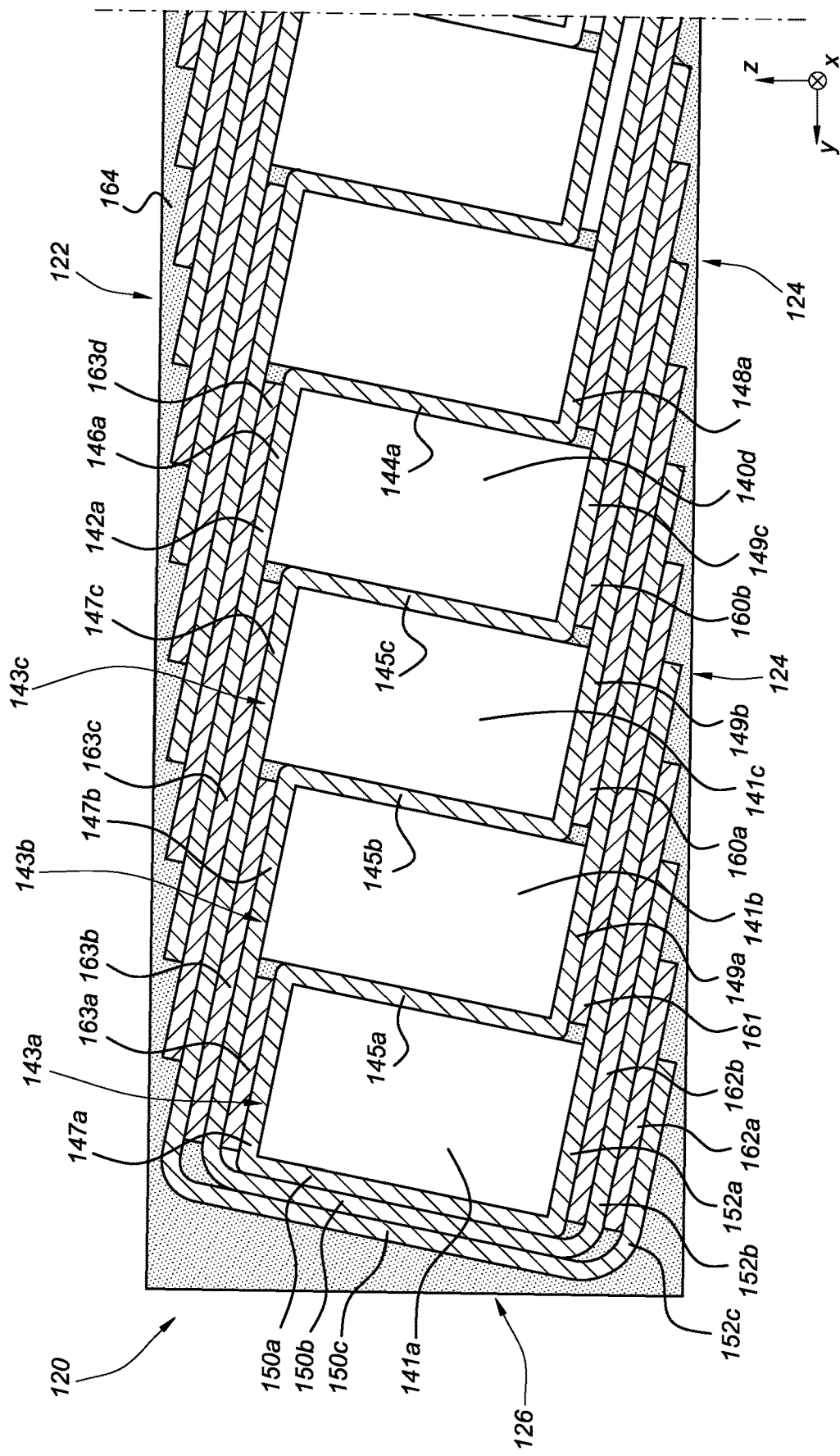

PRODUCT WITH AN ARRAY OF CORE ELEMENTS OR VOIDS AND INTERPOSED SHEETS AND METHODS FOR FORMING SUCH A PRODUCT

Technical Field

The invention relates to a product with an array of core elements or voids and interposed sheets. Furthermore, the invention relates to methods for producing such a product.

Background Art

Panels are known which are particularly suitable for supporting stationary and/or moving objects with a large mass. A bridge deck, for example, has to be sufficiently strong to carry the combined weight of the bridge and the traffic it supports, and also needs a robust deck surface that will remain intact when subjected to local loads exerted by the traffic, falling objects, and the like.

Patent publication WO2010/008293A2 describes a composite panel formed by a number of core elements that extend parallel, and which are mutually connected via strips that extend between the core elements and continue above and below the core elements in an overlapping manner to jointly form outer skins. The strips are fixed by a hardened resin that is applied and cured via resin transfer moulding (RTM) techniques. Via this known construction method, a robust connection between the core elements and outer skins is achieved, which helps to reduce the probability of debonding of the outer skins from core elements in response to local loads.

It would be desirable to provide a panel or similar product with an improved robustness.

SUMMARY OF INVENTION

Therefore, according to a first aspect of the invention, there is provided a product, such as a panel, which defines opposite first and second surfaces. The product comprises sheets and core elements or voids between the sheets. The core elements or voids are elongated and extend mutually parallel along a first direction. These core elements or voids are arranged mutually adjacent in a second direction, and include an outermost core element or void along a product edge. Each of the sheets defines a medial portion, a first lateral portion and a second lateral portion. The medial portion is interposed between two adjacent core elements or voids. The first lateral portion is folded away from the medial portion over one of the two adjacent core elements or voids, and predominantly towards the second direction along the first surface. The second lateral portion folded away from the medial portion over another of the two adjacent core elements or voids, and predominantly towards a negative second direction along the second surface. The sheets include at least one enveloping sheet of which the first lateral portion extends into a folded lateral region that is at or near the product edge folded away from the first surface and around the outermost core element or void, to extend with a non-zero component in the negative second direction back towards the second surface.

The term "sheet" is used herein to refer to a piece of material that is thin in comparison to its length and width dimensions. Preferably, such a sheet has a quadrilateral shape, and more preferably a rectangular shape. The sheets are interposed with medial portions between the core elements or voids, and continue with the lateral portions above and below the cores/voids in an overlapping manner, to jointly form outer skins along the first and second surfaces. The first and second lateral portions of adjacent sheets at least partly cover each other on the first and second surfaces respectively, to form the outer skins.

The sheets in the product according to this aspect may be formed of various materials, which may be initially rigid (i.e. prior to product construction) but plastically deformable to allow bending or folding of the sheet along desired folding lines if subjected to forces, while leaving other regions of the sheet dimensionally stable if subjected to loads associated with normal operational conditions for the product. For example, initially rigid sheet materials may consist essentially of aluminium sheet material, steel sheet material, thermoplastic sheet material, or the like. Alternatively, the sheet material may be initially flexible (prior to product construction) to allow bending or folding into a desired sheet configuration. The manufacturing of such a product should involve a hardening stage for the sheets, which allows the sheets to settle in essentially fixed orientations with respect to the resulting product. Such a hardening stage may for example include impregnation of the sheets by a resin, followed by curing of the resin to form a rigid matrix in which the sheet material is embedded. Impregnation of the sheets may for example occur via resin transfer moulding (RTM) or vacuum assisted resin transfer moulding (VARTM) of a preformed arrangement of sheets. Alternatively, the individual sheets may be impregnated and shaped in advance ("prepreg sheets"), followed by stacking and bonding of the sheets to form a desired profile. In yet another alternative, the sheets may be impregnated directly prior to the arrangement of the sheets into the desired profile e.g. via an immersion bath. Initially flexible sheet material may for example consist essentially of a fabric (e.g. a web, mesh, or mat) of fibre material. In yet alternative implementations, composite constructions with both initially rigid sheets and initially flexible sheets may be used, for example glass reinforced aluminium laminate structures.

The sheets extend along and between the core elements or voids in a Z-like pattern, wherein individual medial sheet portions are interposed between two adjacent cores or voids. The phrase "predominantly towards a positive second direction +Y along the first surface" is used herein to indicate that the first lateral portion of each sheet extends with a large vector component in the positive second direction parallel with the first surface of the panel, in comparison to relatively small or vanishing vector component in a third i.e. out-of-plane direction. The first lateral portions may be oriented at a slight non-zero angle with respect to this positive second direction. Similarly, the phrase "predominantly towards a negative second direction −Y along the second surface" is used herein to indicate that the second lateral portion of each sheet extends with a large vector component in the negative second direction parallel with the second surface of the panel, in comparison to relatively small or vanishing vector component in an out-of-plane direction. The second lateral portions may also be oriented at a slight non-zero angle with respect to this negative second direction.

The product may comprise elongated core elements, which help in defining the product shape during construction and which confer additional stiffness to the product. Such core elements may for example be formed of a rigid lightweight material, like polyurethane (PU) foam. It is, however, not required for the space between the sheets to be filled with core material. The shaped (e.g. folded or hardened) sheet material in the finished panel may already have sufficient stiffness of its own, thus obviating the need to include core elements. Composite panels with voids instead of cores that are enclosed by respective pairs of adjacent medial sheet portions and pairs of lateral sheet portions may be manufactured by pultrusion techniques and autoclave techniques, which are known per se (e.g. from patent publication WO2016/085336A1).

The term "outermost core element or void" refers herein to a core element or void that is located nearest to an edge of the product that is parallel with the direction of elongation of the core elements. The term "near" refers herein to a distance in the order of less than a typical transverse dimension of the core elements or voids.

The term "enveloping sheet" refers herein to a sheet that extends along and between adjacent core elements or voids in a regular arrangement (e.g. a Z-pattern), but which additionally extends around the outermost core element or void, to envelop this core or void in transverse and vertical directions (but not necessarily in longitudinal directions). By forming at least one of the interposed sheets of fibre material as an enveloping sheet that is folded around the outermost core element or void and back towards the second surface, the product edge can be efficiently sealed by the sheet. The resulting arrangement of cores/voids and sheets yields a panel with a sealed and reinforced edge. Preferably, the folded lateral region of the enveloping sheet covers at least one second lateral portion of an adjacent sheet.

A product according to this aspect may for example be used in a composite construction, in the form of a panel (for example in a bridge, a bridge deck, a lock gate), an aerofoil (for example a wing, a rudder blade, or a turbine blade), or similar structure. The product defines first and second surfaces on opposite sides, both surfaces extending with a significant vector component along the second direction Y. Such a product may for example constitute or include a panel, wherein the first and second sides are predominantly flat (i.e. planar). The first and second surfaces may be oriented mutually parallel, to yield a product (e.g. panel) with a predominantly rectangular cross-section and a uniform thickness. The first surface may also be oriented at a non-zero angle relative to the second surface, to yield a product with a prismatic (e.g. trapezoidal) cross-section. In addition, the first and the second surfaces may be curved as a function along the second direction Y, for example into a curved wing-like shape.

According to an embodiment, the core elements or voids include a penultimate core element or void, which is arranged along and adjacent to the outermost core element or void, and the sheets include an outermost sheet. The medial portion of this outermost sheet is interposed between the outermost core element or void and the penultimate core element or void. The first lateral portion of this outermost sheet is folded away from the medial portion over the outermost core element or void predominantly towards the positive second direction along the first surface, and the second lateral portion of this outermost sheet is folded away from the corresponding medial portion over the penultimate core element or void predominantly towards the negative second direction along the second surface. The folded lateral region of the enveloping sheet includes a further folded lateral region that is folded predominantly towards the negative second direction along the second surface to at least partially overlap with the second lateral portion of the outermost sheet.

The term "outermost sheet" refers herein to a sheet member that is located with its medial sheet portion between the outermost core/void and the adjacent (i.e. penultimate) core/void. By arranging the outermost sheet with a first lateral portion folded around the outermost core/void and back to abut with its second lateral portion, the structural integrity and/or the sealing of the product edge can be improved further.

The term "overlap" and the phrase "A overlaps (with) B" are used herein to indicate that part or all of object A extends over and covers at least a part or all of object B. Furthermore, the expression "A overlaps (with) B in/along direction Q" is used herein to indicate that A extends in the above-mentioned manner over part or all of B along the Q-direction. As a result, object A covers part or all of object B if viewed along at least one direction perpendicular to Q. The overlap of A and B may but does not necessarily imply that A and B are in direct physical contact. The overlap defines a reciprocal spatial relation, in that "A overlaps B" also implies "B overlaps A".

To further improve the strength and sealing of the product edge, the outermost sheet may be formed as one of the enveloping sheets. Such an outermost sheet includes a first lateral portion that extends into a lateral region that is folded away from the first surface and along the outermost core element, and a further folded lateral region that is folded in the opposite direction along the second surface, to at least partially overlap with the second lateral portion of the outermost sheet.

It is not required that the outermost sheet forms one of the enveloping sheets, though. The one or more enveloping sheets may instead be associated with cores or voids that are located further away from the product edge, while the outermost sheet is folded in a regular arrangement (e.g. a Z-pattern) without extending around the outermost core element or void.

According to an embodiment, the sheets comprise a penultimate sheet of which the corresponding first lateral portion extends into a folded lateral region that is folded away from the first surface around the outermost core element or void, and a further folded lateral region that is folded predominantly towards the negative second direction along the second surface, to at least partially overlap with the second lateral portion of the outermost sheet, and optionally also at least partially overlaps with a further folded lateral region of the outermost sheet.

The outermost sheet may be an enveloping sheet, and the further lateral region of the penultimate sheet may (partially) overlap with the second lateral portion as well as the further lateral region of the outermost sheet. In this arrangement, the further lateral region of the outermost sheet is arranged between the further lateral region of the penultimate sheet on the one hand and the second lateral portion of the outermost sheet on the other hand.

Alternatively, the outermost sheet may be a non-enveloping sheet, and the further lateral sheet region of the penultimate sheet may (partially) directly overlap with the second lateral portion of the outermost sheet.

According to an embodiment, the core elements or voids include a series of consecutive outer core elements or voids, and the sheets include a series of consecutive enveloping sheets of which the first lateral portion extends into a folded lateral region that is folded away from the first surface around the outermost core element or void, and into a further folded lateral region that is folded predominantly towards the negative second direction along the second surface to at least partially overlap with the further folded lateral region of a preceding enveloping sheet.

According to embodiments, the product includes one or more reinforcing strips at various locations. The strips may be formed of a sheet of fibre reinforced plastic, a solid body of plate material, or a composite material. The strips may for instance be formed by unidirectional fibre composite material, having an along-fibre modulus of elasticity that exceeds 35 gigapascal (GPa) or preferably exceeds 100 GPa, and an along-fibre tensile strength that exceeds 800 megapascal (MPa) or preferably exceeds 1200 MPa. Exemplary strip materials are unidirectional glass fibre composite (E-modulus strip≈39 GPa, tensile strength≈900 MPa), unidirectional High Strength carbon fibre composite (E-modulus strip≈120 GPa, tensile strength≈1900 MPa), or unidirectional High Modulus carbon fibre composite (E-modulus strip≈330 GPa, tensile strength ≈1300 MPa).

For instance, the product may include at least one strip, which extends near the second surface and substantially parallel with at least one core or void, and which is sandwiched between the second lateral portions of two adjacent sheets.

Alternatively or in addition, the product may include an intermediate strip, which extends near the second surface substantially parallel with at least one core element or void, and which is sandwiched between the further folded lateral region of an enveloping sheet and the second lateral portion of the same enveloping sheet, or sandwiched between the further folded lateral region of the enveloping sheet and the second lateral portion of an adjacent non-enveloping sheet.

Alternatively or in addition, the product may include at least one edge strip, which extends near the second surface substantially parallel with at least one core element or void, and which is sandwiched between the further folded lateral regions of two adjacent enveloping sheets. One such edge strip may for example be located along the outermost core element, and between the further folded lateral region of the outermost sheet and the further folded lateral region of the penultimate sheet.

Alternatively or in addition, the product may include at least one further strip, which extends near the first surface substantially parallel with at least one core element or void, and which is located between the first lateral portions of two adjacent sheets. One such further strip may for example be located along the outermost core element, and between the first lateral portion of the outermost sheet and the first lateral portion of the penultimate sheet.

Any of the strips and/or further strips may be sandwiched along its entire extent between two lateral sheet portions. Alternatively, any of the strips may be positioned with a part extending along and touching a surface of a core element that faces towards the second panel surface, or extending along a corresponding surface of a core void. Similarly, any of the further strips may be partially positioned along and touching a surface of a core element that faces towards the first panel surface, or extending along a corresponding surface of a core void.

In embodiments, the first lateral portion of each sheet is folded predominantly towards the positive second direction along the first surface, so that the first lateral portion is at a first tilt angle $\beta 1$ in a range $0°<\beta 1<5°$ with respect to the first surface. Preferably, the first tilt angle $\beta 1$ is in a range $0°<\beta 1 \leq 2°$.

Alternatively or in addition, the second lateral portion of each sheet may be folded predominantly towards the negative second direction along the second surface, so that the second lateral portion is at a second tilt angle $\beta 2$ in a range $0°<\beta 2<5°$ with respect to the second surface. Preferably, the second tilt angle $\beta 2$ is in a range $0°<\beta 2 \leq 2°$.

In the case that the first and second product surfaces are essentially parallel, the first and second tilt angles are preferably essentially identical ($\beta 1 \approx \beta 2$).

According to embodiments, the first lateral portion of the sheet is folded predominantly towards the positive second direction along the first surface over a sequence of at least three adjacent core elements or voids. The resulting imbricated arrangement of sheet portions then includes overlaps of at least three first lateral portions of corresponding three adjacent sheets. The overlap of first lateral sheet portions may for example include four to six layers, to obtain a good balance between product strength and manufacturing complexity.

Alternatively or in addition, the second lateral portion of the sheet is folded predominantly towards the negative second direction along the second surface over a sequence of at least three opposite adjacent cores or voids. The resulting imbricated arrangement may thus include overlaps of at least three second lateral portions of corresponding three adjacent sheets. Similarly, the overlap of second lateral sheet portions may for example include four, five, or six layers. Preferably, the number of overlapping sheet layers is the same on both surfaces of the product.

In addition, the lengths of the (further) folded lateral regions may be such that the number of overlapping layers near the product edge is the same as for the overlapping second lateral portions (i.e. three or more).

The arrangement of sheets and cores or void in accordance with the first aspect (and its various embodiments) may be similarly applied on another edge of the product, for instance on the product edge on the opposite side of the array of cores or voids, viewed along the second direction. One or more enveloping sheets may be arranged around a further outermost core or void on this opposite product edge, and may be provided in a mirror-symmetric manner relative to the third direction.

In embodiments, the core elements or voids have cross-sectional symmetry in planes perpendicular to the first direction. Such planes are parallel with second and third directions, and the cross sectional shapes of the core elements or voids may be mirror-symmetric relative to a line within such a plane, or rotationally symmetric about an axis along the first direction.

Alternatively or in addition, the core elements or voids may be geometric prisms with polygonal cross-sectional shapes in planes perpendicular to the first direction. Preferably these polygonal shapes are triangular, quadrilateral, pentagonal, or hexagonal. More preferably, these polygonal shapes are regular triangular or rectangular.

The product may be substantially flat along the third direction, or may have a concave shape with a smooth curvature in the third direction as a function along the first and/or second directions.

According to a second aspect, and in accordance with the advantages and effects described herein above, there is provided a reinforced composite construction, in particular a bridge, a bridge deck, a lock gate, a turbine blade, or a wing. This reinforced composite construction includes a product (e.g. a panel or aerofoil) in accordance with the first aspect.

Product embodiments according to the first aspect may be manufactured by various methods. Different methods may be selected for products with different characteristics. A product may for instance be manufactured by RTM techniques and include core elements enclosed between the various sheet portions, or may be manufactured by pultrusion techniques and include voids instead of core elements at several or all of the corresponding positions.

According to a third aspect, there is provided a method for producing a product with first and second surfaces on opposite sides. The method comprises positioning elongated core elements mutually parallel, and positioning sheets with foldable material extending along and between the core elements on a support structure. This positioning of the core elements and sheets includes:—positioning the core elements mutually parallel and extending along a first direction, and mutually adjacent in an array along a second direction, with an outermost core element along an edge;—interposing a medial portion of a sheet between two adjacent core elements;—folding a first lateral portion of the sheet away from its medial portion over one of the two adjacent core elements and predominantly towards the second direction along the first surface, and—folding a second lateral portion of each sheet away from its medial portion over another of the two adjacent core elements and towards a negative second direction along the second surface. The sheets include an enveloping sheet with a first lateral portion that extends into a lateral region and a further lateral region, and the method further comprises:—folding the lateral region away from the first surface and around the outermost core element, and—folding the further lateral region with a non-zero component in the negative second direction towards the second surface.

The method may further comprise positioning the sheets into a sheet arrangement wherein the lateral portions and further lateral portions of adjacent sheets at least partially overlap.

According to an embodiment, the sheets include an outermost sheet with a first lateral portion that extends into a lateral region and a further lateral region, and with a second lateral portion. The method may then comprise:—folding the lateral region away from the first surface and around the outermost core element, and—folding the further lateral region back in the negative second direction along the second surface to create at least a partial overlap with the second lateral portion of the outermost sheet.

In a further embodiment, the method comprises positioning at least one strip along a respective core element. The strip(s) is (are) sandwiched between the first lateral portions of two adjacent sheets, the second lateral portions of two adjacent sheets, the further folded lateral region of an enveloping sheet and the second lateral portion of the same enveloping sheet, the further folded lateral region of the enveloping sheet and the second lateral portion of an adjacent non-enveloping sheet, or the further folded lateral regions of two adjacent enveloping sheets.

In embodiments, the sheets comprise essentially of foldable fibre material, and the method comprises:—impregnating the sheets or the assembly of sheets with folded-over lateral sheet portions with a hardenable substance (e.g. a resin), and—causing the hardenable substance to harden to form the product, thereby mutually fixing the overlapping first lateral portions and the overlapping second lateral portions of the sheets. If one or more reinforcing strips are positioned between adjacent sheets, these strips may be impregnated with the hardenable substance together with the sheets, prior to curing.

The support structure may for instance be a mould, for bounding the assembly of sheets and the core elements during the impregnation step. This mould may comprise a mould edge for bounding the product during moulding, and the outermost core element may be arranged along the mould edge. The method may further involve enclosing of the cores and the sheets under a temporary cover layer in a sealing manner with respect to the mould, during the impregnation step.

In alternative method embodiments, the sheets may already be provided in advance in the form of rigid structures. The sheets may then be positioned and fixed to each other in the desired arrangement by suitable methods that may be selected on the basis of the sheet material used, e.g. by using adhesive, welding, riveting, or fusion bonding.

According to a fourth aspect, there is provided a method for producing a product (e.g. a panel). This method comprises:—providing a plurality of sheets of fibre material;—providing an arrangement of shaping elements, which extend predominantly in a first direction, and which are arranged mutually adjacent in a second direction while defining gaps in between pairs of adjacent shaping elements;—continuously and simultaneously moving the sheets predominantly in the first direction via the gaps and along the shaping elements;—during moving, folding each sheet around a respective shaping element to form a medial sheet portion between two adjacent shaping elements, a first lateral sheet portion which projects predominantly in a positive second direction transversely with respect to the medial sheet portion, and a second lateral sheet portion which projects predominantly in a negative second direction transversely with respect to the medial sheet portion;—causing the first lateral sheet portions of different sheets to at least partly cover each other, and causing the second lateral sheet portions of different sheets to at least partly cover each other. An assembly of sheets with folded-over lateral sheet portions and voids is thereby formed, wherein the voids are enclosed by a pair of adjacent medial portions and a pair of first and second lateral sheet portions. These steps may for instance be executed using a shaping device with shaping elements as described in FIGS. 2a-3c and paragraphs 30-34 of patent publication WO2016/085336A1, which is incorporated herein by reference. However, the method according to this fourth aspect further comprises:—while moving the sheets, folding a lateral region of the first lateral portion of at least one enveloping sheet at or near the product edge away from a first surface around an outermost shaping element, and with a non-zero component in the negative second direction back towards a second surface. Also the outermost void thus becomes enclosed by a medial sheet portion and the first lateral portion of the enveloping sheet.

In an embodiment, the method includes folding of the first lateral sheet portions and second lateral sheet portions by moving a shaping element, such as a roller, in the second directions and third directions around a contour, which is defined by the shaping elements and has a contour axis directed predominantly along the first direction.

In embodiments, at least one reinforcement strip is continuously and simultaneously inserted in between the sheets, when the latter are moved via the gaps and along the shaping elements. Such strips may be sandwiched between the first lateral portions of two adjacent sheets, the second lateral portions of two adjacent sheets, the further folded lateral region of an enveloping sheet and the second lateral portion of the same enveloping sheet, the further folded lateral region of the enveloping sheet and the second lateral portion of an adjacent non-enveloping sheet, or the further folded lateral regions of two adjacent enveloping sheets.

In embodiments, the method further comprises:—impregnating the sheets or the assembly of sheets with folded-over lateral sheet portions with a hardenable substance, and—causing the hardenable substance to harden to form the product, in such a manner that voids remain, wherein each void is enclosed by a pair of adjacent medial portions and a pair of first and second lateral sheet portions.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the element number. For example two specific instances of a particular element "20" may be labelled with appended letters, e.g. as "20a" and "20b". The element label may be used with an index i or j (e.g. "20i") to refer to an unspecified instance of the element, while the element label may be used without an appended letter (e.g. "20") to generally refer to every instance of the element.

FIG. 2 presents a schematic cross-sectional view of the panel from FIG. 1, and

FIG. 3 shows a cross-sectional view of an alternative embodiment of a composite panel.

Figure 1:
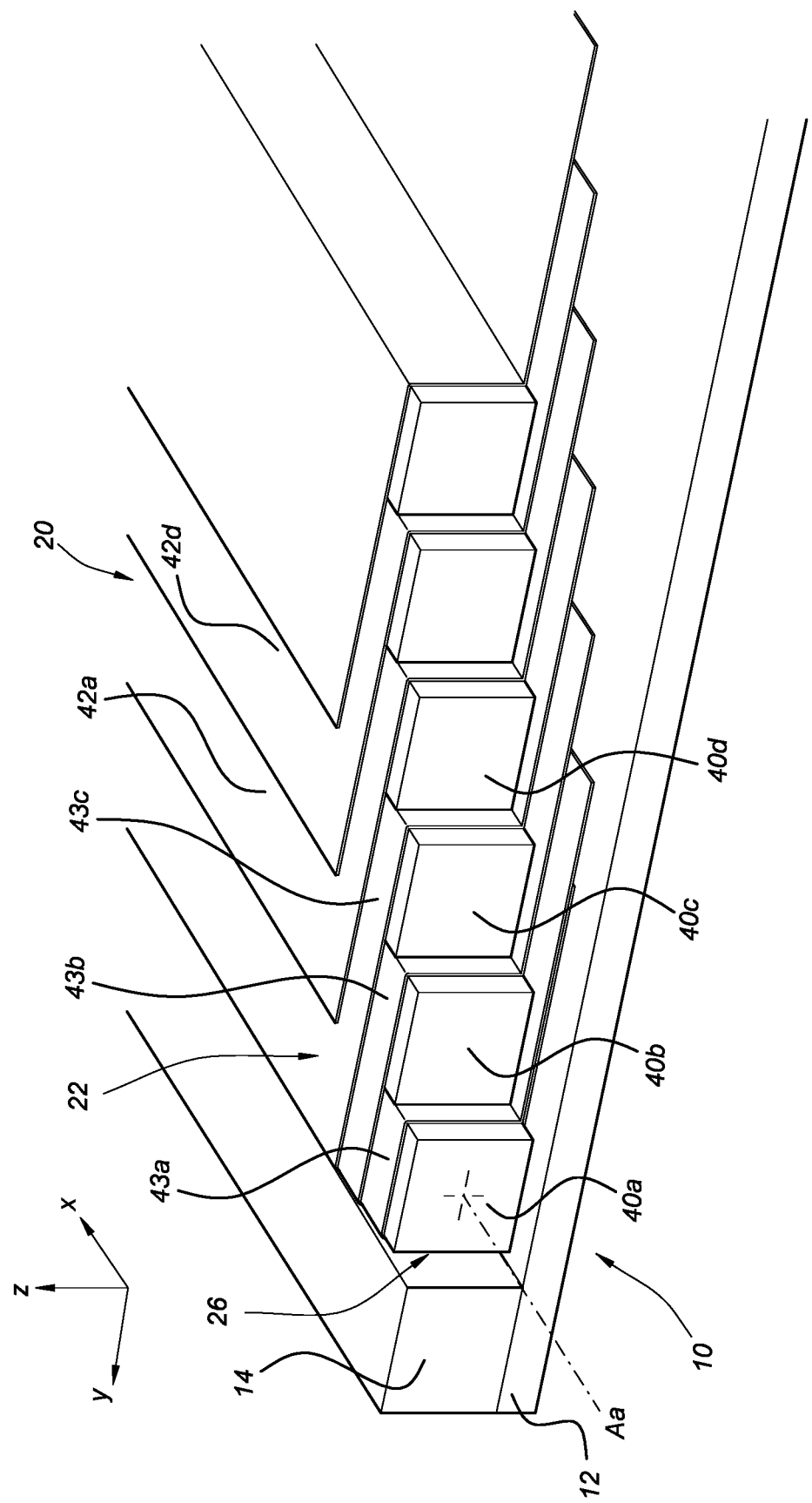
FIG. 1 schematically shows a perspective view of a portion of a composite panel according to an embodiment.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures. In the figures, Cartesian coordinates will be used to describe spatial relations for exemplary product embodiments.

The term "surface" is used herein to generally refer to a two-dimensional parametric surface region, which may have an entirely or piece-wise flat shape (e.g. a plane or polygonal surface), a curved shape (e.g. cylindrical, spherical, parabolic surface, etc.), a recessed shape (e.g. stepped or undulated surface), or a more complex shape. The term "plane" is used herein to refer to a flat surface defined by three non-coinciding points.

FIG. 1 schematically shows a perspective view of part of a composite panel 20 according to an embodiment. In FIG. 1, parts of the panel 20 have been virtually cut-away in a staircase pattern, merely to illustrate the layout of the distinct core elements and sheets with fibre material. It should, however, be understood that the relative positions of cross-cut sides of the elements and sheets may deviate from FIG. 1, and may for instance all be lined up along a same nominal plane (e.g. being bounded by an upstanding edge of a moulding table). FIG. 2 presents a schematic cross-sectional view of the panel 20 from FIG. 1. FIGS. 1 and 2 show that the panel 20 includes a series of core elements 40, and sheets 42, 43 with fibre material.

Each core element 40i (index i=a, b, c . . . ) has an elongated shape that extends along a longitudinal direction X. The core elements 40 are arranged parallel, and adjacent to (alongside) each other in an array along a transverse direction Y, which is perpendicular to X. A vertical direction Z is defined perpendicular to both X and Y. The arrangement of core elements 40 defines a first surface 22 and a second surface 24 on opposite sides of the panel 20, and facing along positive and negative vertical directions ±Z respectively. In this embodiment, the panel 20 is substantially flat, so that characteristic panel dimensions in the longitudinal and transverse directions X, Y are substantially larger than in the vertical direction Z. Each core element 40 is symmetric in cross-sectional YZ-planes that are perpendicular to the longitudinal direction X. In this example, the core elements 40 have rectangular cross-sectional shapes in local YZ-planes, which are rotationally symmetric about associated central core axes A (only nominal axis Aa is indicated in FIG. 1).

The arrangement of cores 40 includes an outermost core element 40a, which extends along a longitudinal edge 26 of the panel 20. A penultimate core element 40b and a third last core element 40c are arranged in a sequence directly next to the outermost core element 40a. Further core elements 40d, etc. are arranged at consecutive positions along the negative transverse direction −Y.

The sheets 42, 43 with fibre material can be distinguished into sheets 42 which are located away from the panel edge 26 and which do not envelop the outermost core element 40a ("non-enveloping sheets"), and into sheets 43 that are located towards the longitudinal panel edge 26 and which do envelop the outermost core element 40a ("enveloping sheets") in transverse and vertical directions Y, Z.

Each sheet 42i, 43i includes a medial portion 44i, 45i, a first lateral portion 46i, 47i, and a second lateral portion 48i, 49i. The medial portion 44i, 45i is interposed between two corresponding adjacent core elements 40.

The first lateral portion 46, 47 of each sheet 42, 43 is folded away from the medial portion 44, 45 over the corresponding first adjacent core element 40, here in a positive transverse direction +Y, in order to extend predominantly along the first surface 22. The second lateral portion 48, 49 of each sheet 42, 43 is folded away from the medial portion 44, 45 over the corresponding second adjacent core element 40, in this example in a negative transverse direction −Y, in order to extend predominantly along the second surface 24.

The first lateral portions 46, 47 of adjacent sheets 42, 43 are arranged in an at least partially overlapping manner. The first lateral portion 46, 47 of each sheet 42, 43 is folded over a sequence of three adjacent core elements 40, yielding an imbricated triple-layered overlap along the first surface 22. Similarly, the second lateral portions 48, 49 of adjacent sheets 42, 43 are arranged in an at least partially overlapping manner. The second lateral portion 48, 49 of each sheet 42, 43 is folded over a sequence of three adjacent core elements 40 in the opposite direction, also yielding an imbricated triple-layered overlap along the second surface 24. The resulting arrangement of overlapping sheets may be described as an "oblique layered material" and the arrangement of cores and overlapping sheets may be described as an "oblique layered composite structure".

The first lateral portion 46, 47 of each sheet 42, 43 is oriented along the transverse direction Y at a first tilt angle 131 with respect to the first surface 22. Similarly, the second lateral portion 48, 49 of each sheet 42, 43 is oriented along the transverse direction Y at a second tilt angle 132 with respect to the second surface 24. Upper and lower surfaces of the rectangular cores 40 are tilted at similar angles, by slightly rotating each core 40 in the array about its central core axis A (e.g. core 40a about nominal axis Aa in FIG. 1). This tilted arrangement allows the lateral sheet portions 46-49 to extend in planar arrangement along each other, to exploit the tensile strength of the sheets and improve the strength of the panel. In this example, the first and second panel surfaces 22, 24 are essentially parallel, and the first and second tilt angles are essentially identical $\beta 1 \neq \beta 2$. The value of these angles is preferably small e.g. $0° < \beta 1$, $\beta 2 < 5°$ or even $0° < \beta 1$, $\beta 2 \leq 2°$.

The enveloping sheets 43 include an outermost sheet 43a along the longitudinal panel edge 26. In addition, the enveloping sheets 43 include a penultimate sheet 43b, and a third last enveloping sheet 43c, which are sequentially arranged and associated with subsequent core elements 40.

The medial portion 45a of the outermost sheet 43a is interposed between the outermost core element 40a and a penultimate core element 40b. The first lateral portion 47a of the outermost sheet 43a extends into a lateral region 50a and a further lateral region 52a. These lateral sheet regions 50a-52a form planar regions that are folded under different angles with respect to each other. The first lateral sheet region 50a is folded away from the first lateral portion 47a along the first surface 22, and downwards in a negative vertical direction −Z along the outermost core element 40a and the longitudinal panel edge 26. The second lateral sheet region 52a is folded away from the lateral sheet region 50a, in the opposite transverse direction −Y along the second surface 24. The second lateral sheet region 52a extends further along the second surface 24, to at least partially overlap with the second lateral portion 49a of the outermost sheet 43a.

The medial portion 45b of the penultimate sheet 43b is interposed between the penultimate core element 40b and a next core element 40c, which is directly adjacent to the penultimate core element 40b. The first lateral portion 47b of the penultimate sheet 43b is folded away from the medial portion 45b and extends in the positive transverse direction +Y along the first surface 22 and over both the penultimate core element 40b and the outermost core element 40a. This first lateral portion 47b also extends into a first lateral sheet region 50b and a second lateral sheet region 52b. These lateral sheet regions 50b-52b also form planar regions that are folded under different angles with respect to each other.

The first lateral sheet region 50b is folded away from the first surface 22 and the first lateral portion 47b, downwards in the negative vertical direction −Z and along the outermost core element 40a and the longitudinal panel edge 26. In this example, the first lateral sheet region 50b of the penultimate sheet 43b covers the first lateral sheet region 50a of the outermost sheet 43a. The second lateral sheet region 52b is folded away from the first lateral sheet region 50b, in the negative transverse direction −Y and along the second surface 24. In this example, the second lateral sheet region 52b of the penultimate sheet 43b covers the second lateral sheet region 52a of the outermost sheet 43a.

The lateral sheet portion 47c and regions 50c-52c of the third last sheet 43c are arranged in an analogous manner and overlap with the corresponding sheet portions 47a-47b and at least part of the sheet regions 50b-52c of the penultimate and outermost sheets 43b, 43a. In this example, the lengths of the further folded lateral regions 52a-c of the enveloping sheets 43a-c are such that the imbricated arrangement of sheet portions 49 and sheet regions 52 on the second panel side 24 is also triple-layered near the panel edge 26.

FIG. 3 shows a cross-sectional view of an alternative embodiment of a composite panel 120. Features in the panel 120 that have already been described above with reference to the panel 20 in FIGS. 1 and 2 may also be present in the panel 120 shown in FIG. 3, and will not all be discussed here again. For the discussion with reference to FIG. 3, like features are designated with similar reference numerals preceded by 100, to distinguish the embodiments.

In contrast to the embodiment of FIG. 1, the spaces defined between the various sheet portions of the panel 120 form voids 141, which are not occupied by core elements of solid material. This panel 120 may be formed by pultrusion techniques. In yet alternative embodiments, selected ones or all of the voids 141 may instead be occupied by solid core elements similar to the cores 40 in FIG. 1.

In this embodiment, the panel 120 comprises various strips 160-163 of rigid material. In this example, the strips 160-163 are composed of a unidirectional fibre composite material having an along-fibre modulus of elasticity that exceeds 35 GPa and an along-fibre tensile strength that exceeds 800 MPa. The various strips 160-163 reinforce the resulting panel 120, in particular along the longitudinal edge 126 thereof.

Strips 160a-160b are arranged near the second surface 124, which extend substantially parallel with corresponding voids 141 along the longitudinal direction X. Each of these strips 160 is sandwiched between the second lateral portions 148, 149 of two adjacent sheets 142, 143. In this example, each of the lower strips 160 has a lateral extent of approximately 2% times width of a void 141.

Further strips 163a-163d are arranged near the first surface 122, and also extend substantially parallel with corresponding voids 141 along longitudinal direction X. Each further strip 163 is sandwiched between the first lateral portions 146, 147 of two adjacent sheets 142, 143.

In this example, an intermediate strip 161 extends near and along the penultimate void 141b, near the second panel surface 124. This intermediate strip 161 is sandwiched directly between the second lateral portion 149a and the further lateral region 152a of the outermost sheet 143a.

In this example, two edge strips 162a-162b are provided, which extend near and along the outermost void 141a, at the lower side near the second panel surface 124. Edge strip 162a is sandwiched directly between the further lateral regions 152b, 152c of the penultimate and third last enveloping sheets 143b, 143c. Similarly, edge strip 162b is sandwiched directly between the further lateral regions 152a, 152b of the outermost and penultimate enveloping sheets 143a, 143b.

The present invention may be embodied in other specific forms without departing from its spirit or essential characteristics. The described embodiments are to be considered in all respects only as illustrative and not restrictive.

In the described exemplary embodiments, the outermost sheet formed an enveloping sheet, with the first lateral portion extending into a sheet region that is folded around the outermost core element and product edge, and then back along the opposite panel surface, in order to cover the second lateral portion of the same outermost sheet. In other panel embodiments, however, only sheets that are further removed from the product edge may constitute enveloping sheets with sheet regions that are folded around the outermost core element and towards the second panel surface.

Fewer or more than three enveloping sheets may be present in the product. In the latter case, additional edge strips may be provided, each strip being sandwiched directly between further folded lateral regions of adjacent enveloping sheets.

Although the panel embodiments described above had predominantly planar shapes, it should be understood that the panel may have different shapes in alternative embodiments. The panel may for example have a simple concave shape that gradually curves towards the vertical direction Z as a function along the longitudinal coordinate X. Alternatively, the panel may have a concave curvature towards the vertical direction Z as a function of the transverse coordinate Y. More complex shapes can also be conceived, for example by double curvatures in both the longitudinal and transverse directions and/or curvatures with multiple local minima/maxima and/or points of inflection.

Products may be manufactured by various methods. The product may for instance include core elements enclosed between the various sheet portions, or may include voids instead of core elements at several or all of the corresponding positions.

Also, the core elements or voids should not be considered limited to elongated structures with essentially square cross-sectional shapes. Core elements with other shapes would also be possible. Exemplary alternatives are core elements, each with a cross-sectional shape having discrete rotational symmetry under rotations about its body axis A along the X-direction (e.g. a triangular or rectangular shape), and/or having mirror-symmetry with respect to one or more lines in YZ-planes, or with more general polygonal (e.g. quadrilateral) or curved cross-sectional shapes.

The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

Note that for reasons of conciseness, the reference numbers corresponding to similar elements in the various embodiments (e.g. elements 110, 210 being similar to element 10) have been collectively indicated in the claims by their base numbers only i.e. without the multiples of hundreds. However, this does not suggest that the claim elements should be construed as referring only to features corresponding to base numbers. Although the similar reference numbers have been omitted in the claims, their applicability will be apparent from a comparison with the figures.

LIST OF REFERENCE SYMBOLS

Similar reference numbers that have been used in the description to indicate similar elements (but differing only in the hundreds) should be considered implicitly included.
10 mould
12 support surface
14 mould edge
18 mould support frame
20 panel
22 first panel surface
24 second panel surface
26 first panel edge (longitudinal edge)
28 second panel edge (opposite longitudinal edge)
30 third panel edge
32 fourth panel edge
40 core element
42 non-enveloping sheet (e.g. web or plate material)
43 enveloping sheet (e.g. web or plate material)
44 medial portion of non-enveloping sheet
45 medial portion of enveloping sheet
46 first lateral portion of non-enveloping sheet
47 first lateral portion of enveloping sheet
48 second lateral portion of non-enveloping sheet
49 second lateral portion of enveloping sheet
50 folded lateral region
52 further folded lateral region
64 hardenable substance (e.g. resin)
141 core void
160 strip
161 intermediate strip
162 edge strip
163 further strip A nominal axis (of core element)
X first direction (longitudinal direction)
Y second direction (transverse direction)
Z third direction (vertical direction)
$\beta 1$ first tilt angle
$\beta 2$ second tilt angle

The invention claimed is:

1. A product which defines opposite first and second surfaces, and which comprises:
   core elements or voids, which are elongated and extend mutually parallel along a first direction, which are arranged mutually adjacent in an array along a second direction and which include an outermost core element or void along a product edge;
   sheets wherein each sheet defines:
   a medial portion interposed between two adjacent core elements or voids;
   a first lateral portion folded away from the medial portion over one of the two adjacent core elements or voids, and predominantly towards a positive second direction along the first surface;
   a second lateral portion folded away from the medial portion over another of the two adjacent core elements or voids, and predominantly towards a negative second direction along the second surface;
   wherein the sheets include at least one enveloping sheet of which the first lateral portion extends into a folded lateral region that is at or near the product edge folded away from the first surface and around the outermost core element or void, to extend with a non-zero component in the negative second direction back towards the second surface, and covers at least one second lateral portion of an adjacent sheet.

2. The product according to claim 1, wherein the core elements or voids include a penultimate core element or void adjacent to the outermost core element or void wherein the sheets include an outermost sheet, which has a medial portion that is interposed between the outermost core element or void and the penultimate core element or void, a first lateral portion that is folded away from the medial portion around the outermost core element or void and predominantly towards the second direction along the first surface, and a second lateral portion that is folded away from the corresponding medial portion over the penultimate core element or void predominantly towards the negative second direction along the second surface;
   wherein the folded lateral region of the enveloping sheet includes a further folded lateral region that is folded predominantly towards the negative second direction along the second surface at least partially overlap with the second lateral portion of the outermost sheet.

3. The product according to claim 2, wherein the at least one enveloping sheet includes the outermost sheet, so that the further folded lateral region of the outermost sheet is folded predominantly towards the negative second direction along the second surface to at least partially overlap with the second lateral portion of the outermost sheet.

4. The product according to claim 2, wherein the sheets comprise a penultimate sheet of which the corresponding first lateral portion extends into:
   a lateral region that is folded away from the first surface around the outermost core element or void, and
   a further lateral region that is folded predominantly towards the negative second direction along the second surface, to at least partially overlap with the second lateral portion of the outermost sheet, and optionally also at least partially overlaps with a further lateral region of the outermost sheet.

5. The product according to claim 1, wherein the core elements or voids include a series of consecutive outer core elements or voids, and wherein the sheets include a series of consecutive enveloping sheets of which the first lateral portion extends into a lateral region that is folded away from the first surface around the outermost core element or void, and into a further lateral region that is folded predominantly towards the negative second direction along the second surface to at least partially overlap with the further lateral region of a preceding enveloping sheet.

6. The product according to claim 1, comprising a strip, which extends near the second surface and substantially parallel with at least one core element or void, and which is sandwiched between the second lateral portions of two adjacent sheets.

7. The product according to claim 1, comprising an intermediate strip which extends near the second surface substantially parallel with at least one core element or void, and which is sandwiched between the further lateral region of an enveloping sheet and the second lateral portion of the same enveloping sheet, or sandwiched between the further lateral region of the enveloping sheet and the second lateral portion of an adjacent non-enveloping sheet.

8. The product according to claim 1, comprising an edge strip, which extends near the second surface substantially parallel with at least one core element or void, and which is sandwiched between the further lateral regions of two adjacent enveloping sheets.

9. The product according to claim 1, comprising a further strip, which extends near the first surface substantially parallel with at least one core element or void and which is located between the first lateral portions of two adjacent sheets.

10. The product according to claim 1, wherein the first lateral portion of each sheet is folded predominantly towards the second direction along the first surface, so that the first lateral portion extends along the second direction at a first tilt angle β1 in a range $0°<β1<5°$ with respect to the first surface.

11. The product according to claim 1, wherein the second lateral portion of each sheet is folded predominantly towards the negative second direction along the second surface, so that the second lateral portion extends along the second direction at a second tilt angle β2 in a range $0°<(β2<5°$ with respect to the second surface.

12. The product according to claim 1, wherein the first lateral portion of the sheet is folded predominantly towards the second direction along the first surface over a sequence of at least three adjacent core elements or voids.

13. The product according to claim 1, wherein the second lateral portion of the sheet is folded predominantly towards the negative second direction along the second surface over a sequence of at least three opposite adjacent core elements or voids, and over at least four opposite adjacent core elements or voids.

14. The product according to claim 1, wherein the core elements or voids have cross-sectional symmetry in planes perpendicular to the first direction.

15. The product according to claim 1, wherein the core elements or voids have polygonal cross-sectional shapes.

16. The product according to claim 1, having a concave shape with a smooth curvature in a third direction (Z) as a function along the first direction (X), the first and third directions being substantially perpendicular to the second direction (Y).

17. A method for producing a product the product defining first and second surfaces on opposite sides, wherein the method comprises positioning elongated core elements and sheets with foldable material extending along and between the core elements on a support structure including:
- positioning the core elements mutually parallel and extending predominantly along a first direction (X), and mutually adjacent in an array along a second direction (Y), with an outermost core element along an edge;
- interposing a medial portion of a sheet between two adjacent core elements,
- folding a first lateral portion of the sheet away from its medial portion over one of the two adjacent core elements and predominantly towards the second direction (Y) along the first surface;
- folding a second lateral portion of the sheet away from its medial portion over another of the two adjacent core elements and towards a negative second direction (−Y) along the second surface;
- wherein the sheets include an enveloping sheet with a first lateral portion that extends into a lateral region and a further lateral region, wherein the method further comprises:
- folding the lateral region away from the first surface and around the outermost core element;
- folding the further lateral region with a non-zero component in the negative second direction (−Y) towards the second surface.

18. The method according to claim 17, wherein the sheets include an outermost sheet with a first lateral portion that extends into a lateral region, and a further lateral region, and with a second lateral portion, wherein the method comprises:
- folding the lateral region away from the first surface and around the outermost core element;
- folding the further lateral region back in the negative second direction (−Y) along the second surface to create at least a partial overlap with the second lateral portion of the outermost sheet.

19. The method according to claim 18, comprising:
positioning at least one strip along a respective core element, the strip being sandwiched between:
- the first lateral portions of two adjacent sheets;
- the second lateral portions of two adjacent sheets;
- the further folded lateral region of an enveloping sheet and the second lateral portion of the same enveloping sheet;
- the further folded lateral region the enveloping sheet and the second lateral portion of an adjacent non-enveloping sheet, or
- the further folded lateral regions of two adjacent enveloping sheets.

20. A method for producing a product, comprising:
providing a plurality of sheets of foldable material;
providing an arrangement of shaping elements, which extend mutually parallel along a first direction (X), and which are arranged mutually adjacent in a second direction (Y) while defining gaps in between pairs of adjacent shaping elements;
continuously and simultaneously moving the sheets predominantly in the first direction via the gaps and along the shaping elements;
during moving, folding each sheet around a respective shaping element to form a medial sheet portion between two adjacent shaping elements, a first lateral sheet portion which projects predominantly in the second direction (Y) transversely with respect to the medial sheet portion, and a second lateral sheet portion which projects predominantly in a negative second direction (−Y) transversely with respect to the medial sheet portion;

causing the first lateral sheet portions of different sheets to at least partly cover each other, and causing the second lateral sheet portions of different sheets to at least partly cover each other, and folding a lateral region of at least one enveloping sheet (143) at or near the first product edge away from a first surface and around an outermost shaping element, and with a non-zero component in the negative second direction (−Y) back towards a second surface;

thereby forming an assembly of sheets with folded-over lateral sheet portions and voids, wherein each void is enclosed by a pair of adjacent medial portions and a pair of first and second lateral sheet portions.

21. The method according to claim 18, wherein the sheets comprise essentially of foldable fibre material, and wherein the method comprises:

impregnating the sheets or the assembly of sheets with folded-over lateral sheet portions with a hardenable substance causing the hardenable substance to harden to form the product, thereby mutually fixing the overlapping first lateral portions and the overlapping second lateral portions of the sheets.

22. The method according to claim 21, comprising:

folding the first lateral sheet portions and second lateral sheet portions (148, 149) by moving a shaping element, such as a roller, in the second directions (±Y) and third directions (±Z) around a contour, which is defined by the shaping elements and has a contour axis directed predominantly along the first direction (X).

* * * * *